(12) United States Patent
Morovic et al.

(10) Patent No.: US 11,379,700 B1
(45) Date of Patent: Jul. 5, 2022

(54) HALFTONE MATRIX FOR USE WITH FINE FEATURES

(71) Applicant: Hewlett-Packard Development Company, L.P., Spring, TX (US)

(72) Inventors: Peter Morovic, Sant Cugat del Valles (ES); Jan Morovic, London (GB)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/245,636

(22) Filed: Apr. 30, 2021

(51) Int. Cl.
*G06K 15/02* (2006.01)
*H04N 1/405* (2006.01)
*H04N 1/60* (2006.01)
*H04N 1/409* (2006.01)

(52) U.S. Cl.
CPC ......... *G06K 15/1881* (2013.01); *H04N 1/405* (2013.01); *H04N 1/4055* (2013.01); *H04N 1/6058* (2013.01); *H04N 1/409* (2013.01)

(58) Field of Classification Search
CPC ............ H04N 1/40–4097; H04N 1/52; G06K 15/1881
See application file for complete search history.

(56) References Cited

U.S. PATENT DOCUMENTS 5,150,428 A * 9/1992 Leone .................. H04N 1/4055
358/465
6,252,679 B1 * 6/2001 Wang .................. H04N 1/4058
358/1.9

* cited by examiner

*Primary Examiner* — Scott A Rogers
(74) *Attorney, Agent, or Firm* — HP Inc. Patent Department

(57) ABSTRACT

A method in described in which image data to be printed and a halftone matrix are provided. The halftone matrix comprises rows having randomized values within alternating ranges of values. The halftone matrix is applied to the image data to generate a plurality of halftone patterns.

15 Claims, 7 Drawing Sheets

HALFTONE MATRIX FOR USE WITH FINE FEATURES

BACKGROUND

In printing, halftoning is a process in which a discrete number of printing fluids are distributed spatially to generate a continuous-tone image.

DETAILED DESCRIPTION

Figure 1:
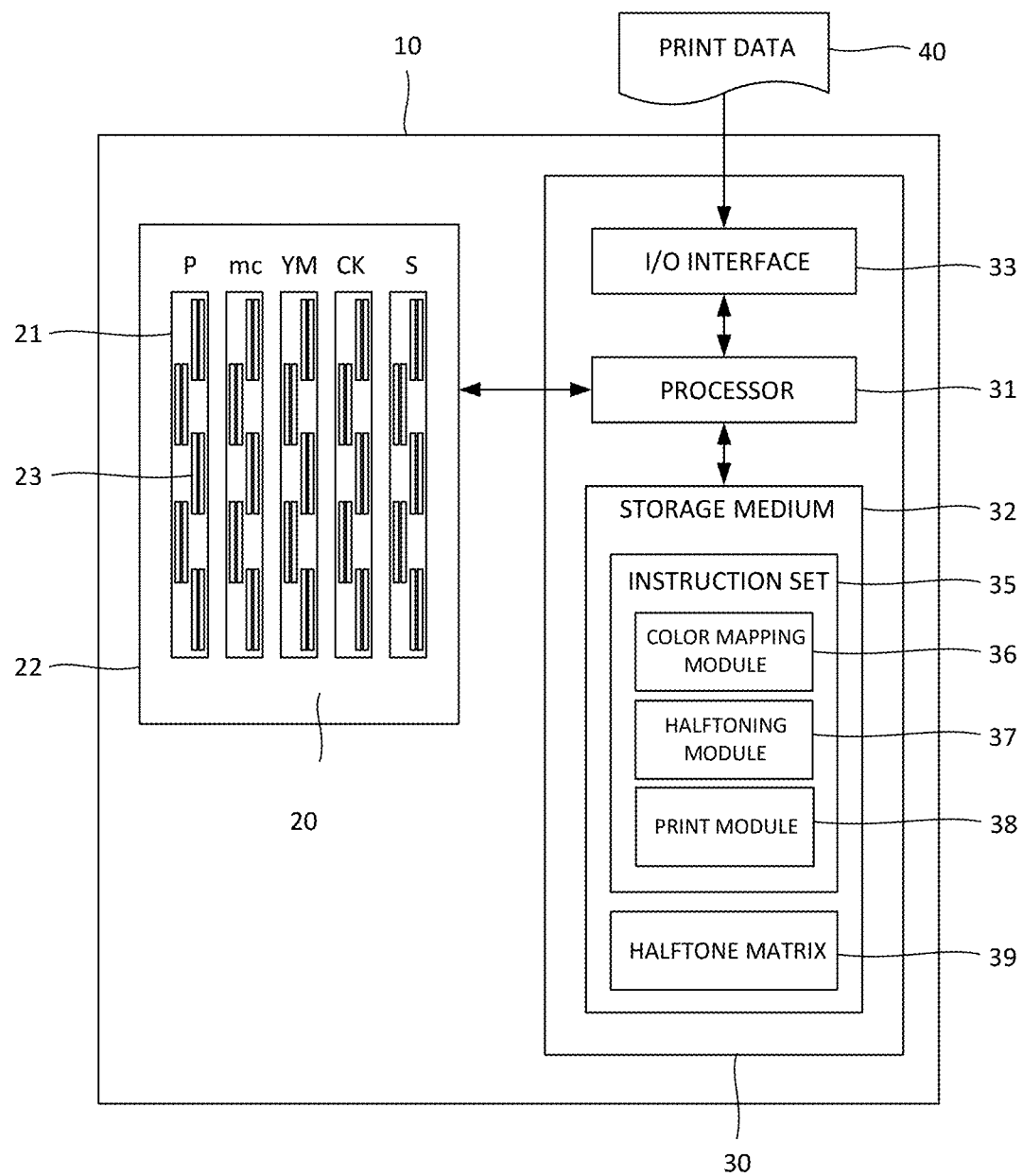
FIG. 1 shows an example printing device.

Color can be represented within imaging devices such as print and display devices in a variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of one or more people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue light. In a digital model, values for these quantities may be defined with reference to a quantized set of values. For example, a color defined using an 8-bit RGB model may have three values stored in a memory, wherein each variable may be assigned a value between 0 and 255. Other color spaces include: a Cyan, Magenta, Yellow and Black (CMYK) color space, in which four variables are used in a subtractive color model to represent different quantities of colorant or printing fluid, e.g. for a printing system; the International Commission on Illumination (CIE) 1931 XYZ color space, in which three variables (X, Y and Z or tristimulus values) are used to model a color; the CIE 1976 (L*, a*, b*—CIELAB or 'LAB') color space, in which three variables represent lightness (L*) and opposing color dimensions (a* and b*); the YUV color space, in which three variables represent the luminance (Y) and two chrominance dimensions (U and V); and the IPT color space, in which the three variables represent a lightness or Intensity dimension (I), a "Protanopia" red-green chroma dimension (P), and a "Tritanopia" yellow-blue chroma dimension (T).

An image to be printed may be described by image data which may comprise a number of pixels or elements of the image which are each associated with a color value in a color space. The color values of the image data may need to be converted into a different color space specific to a printing apparatus for printing the image. For example, an image defined according to an RGB color space may need to be redefined in a CMYK color space corresponding to colorants available to the printing apparatus. A specific combination of colorants or inks to be printed may be specified as an ink-vector, which corresponds to the of colorant for each pixel of an image to be printed.

A colorant may be a dye, a pigment, an ink, or a combination of these materials. A substrate may include various types of paper, including matt and gloss, cardboard, textiles, plastics and other materials.

Other color spaces include area coverage spaces, such as the Neugebauer Primary area coverage (NPac) color space. An NPac vector in the NPac color space represents a statistical distribution of Neugebauer Primaries (NPs) over an area of a halftone. In a simple binary (bi-level, i.e. two drop states: "drop" or "no drop") printer, an NP may be one of $2^k-1$ combinations of k printing fluids within the printing system, or an absence of printing fluid (resulting in $2^k$ NPs in total). An NP may thus be seen as a possible output state for a print-resolution area. The set of NPs may depend on an operating configuration of a device, such as a set of available colorants. A colorant or printing fluid combination as described herein may be formed of one or multiple colorants or printing fluids. For example, if a bi-level printing device uses CMY printing fluids there can be eight NPs or output states. These NPs relate to the following: C, M, Y, CM, CY, MY, CMY, and W (white or blank indicating an absence of printing fluid). An NP may comprise an overprint of a plurality of available printing fluids, such as a drop of magenta on a drop of cyan (for a bi-level printer) in a common addressable print area (e.g. a printable "pixel"). An NP may be referred to as a "pixel state".

Each NPac vector may therefore define a probability distribution for colorant or printing fluid combinations for each halftone pixel in the halftone (e.g. a likelihood that a particular colorant or printing fluid combination or available output state is to be placed or defined at each pixel location in the halftone). In this manner, a given NPac vector defines a set of halftone parameters that can be used in the halftoning process to map a color to NPs to be statistically distributed over the plurality of pixels for a halftone. Moreover, the statistical distribution of NPs to pixels in the halftone serves to control the colorimetry and other print characteristics of the halftone.

Spatial distribution of NPs according to the probability distribution specified in the NPac vector may be performed using a halftone method. Examples of suitable halftoning methods include matrix-selector-based Parallel Random Area Weighted Area Coverage Selection (PARAWACS) techniques and techniques based on error diffusion. An example of a printing pipeline that uses area coverage representations for halftone generation is a Halftone Area Neugebauer Separation (HANS) pipeline.

Each halftone pattern corresponds to an image pixel associated with an NPac vector and comprises a plurality of halftone pixels. The NP associated with the NPac vector are distributed across the halftone pixels according to some pattern to provide the relative area coverage of NP defined by the NPac vector. In order to avoid visual artifacts such as moire, the distribution of NP across the pixels of one halftone pattern are changed compared with the distribution of NP across the pixels of adjacent halftone patterns. In an example, this is achieved by randomizing the distribution of NP across each halftone pattern.

Certain examples described herein address a challenge with printing fine lines or other features. Halftoning certain types of features, such as light, single pixel lines, is a hard problem with any halftoning approach currently available. The main challenge is that a fine feature (such as a 1 pixel line) at a low density, results in few halftone pixels containing drops to be fired. These few pixels then need to be well distributed in order for the resulting print to appear like a well-formed line.

FIG. 1 shows an example of a printing device 10 comprising a carriage assembly 20 and a control unit 30.

The carriage assembly 20 comprises a set of printheads 21 carried by a carriage 22. A drive assembly (not shown) moves the carriage assembly 20 along a scan axis in response to drive signals from the control unit 30.

Each of the printheads 21 comprises a plurality of dies, with each die comprising a plurality of nozzles through which drops of printing fluid are dispensed. The printheads are fluidly coupled to fluid reservoirs (not shown), which supply printing fluids to the printheads. Each printing fluid may be a colorant or a non-colorant, such as a pre-treatment (e.g. fixer/optimizer) or post-treatment (e.g. overcoat) fluid. In the illustrated example, the printing device comprises five printheads that are supplied with eight different printing fluids: cyan (C), magenta (M), yellow (Y), black (K), light cyan (c), light magenta (m), optimizer (P) and overcoat (S).

The control unit 30 comprises a processor 31, a storage medium 32, and an input/output interface 33. The processor 31 is responsible for controlling the operation of the printing device 30 and executes an instruction set 35 stored in the storage medium 32. The instruction set 35 comprises instructions, which when executed by the processor 31, implement a color mapping module 36, a halftoning module 37, and a print module 38. In addition to the instruction set 35, the storage medium 32 stores a halftone matrix 39 for use by the halftoning module 37.

During use, the printing device 30 receives print data 40. In one example, the print data 40 may be a raster image generated by a raster image processor. The color mapping module 36 maps the colors of the print data 40 (e.g. RGB or CMYK) to the colors of the printing device 30, which in this instance is CMYKcmPS.

The color mapping module 36 may map the colors to an area coverage color space, such as the Neugebauer Primary area coverage (NPac) color space. In NPac color space, each pixel of an image is represented by an NPac vector. A Neugebauer Primary (NP) corresponds to one of the possible combinations of printing fluids at each image pixel, including the absence of any printing fluids. The total number of NPs depends on the number of printing fluids, k, and the number of drop states, D, for each printing fluid, and may be defined as $D^k$. So, for a printing device having three printing fluids (e.g. cyan, magenta and yellow) and two drop states (zero drops and one drop), the NPs are: blank, C, M, Y, CM, CY, MY and CMY. An NPac vector defines the relative area covered by each of the NPs. So, for example, an NPac vector of [magenta:0.3; cyan:0.2; blank:0.5] implies that 30% of the area is magenta, 20% is cyan, and 50% is blank.

The halftoning module 37 uses the halftone matrix 39 stored in the storage medium 32 to convert the image data output by the color mapping module 36 into a plurality of halftone patterns, which collectively form a halftone image.

The print module 38 prints the halftone patterns onto a print medium by controlling the travel of the carriage 22 and the firing of the nozzles of the printheads 21 according to the halftone patterns. The print module 38 may print the halftone patterns in multiple printing passes and/or using multiple sets of printheads.

Figure 2:
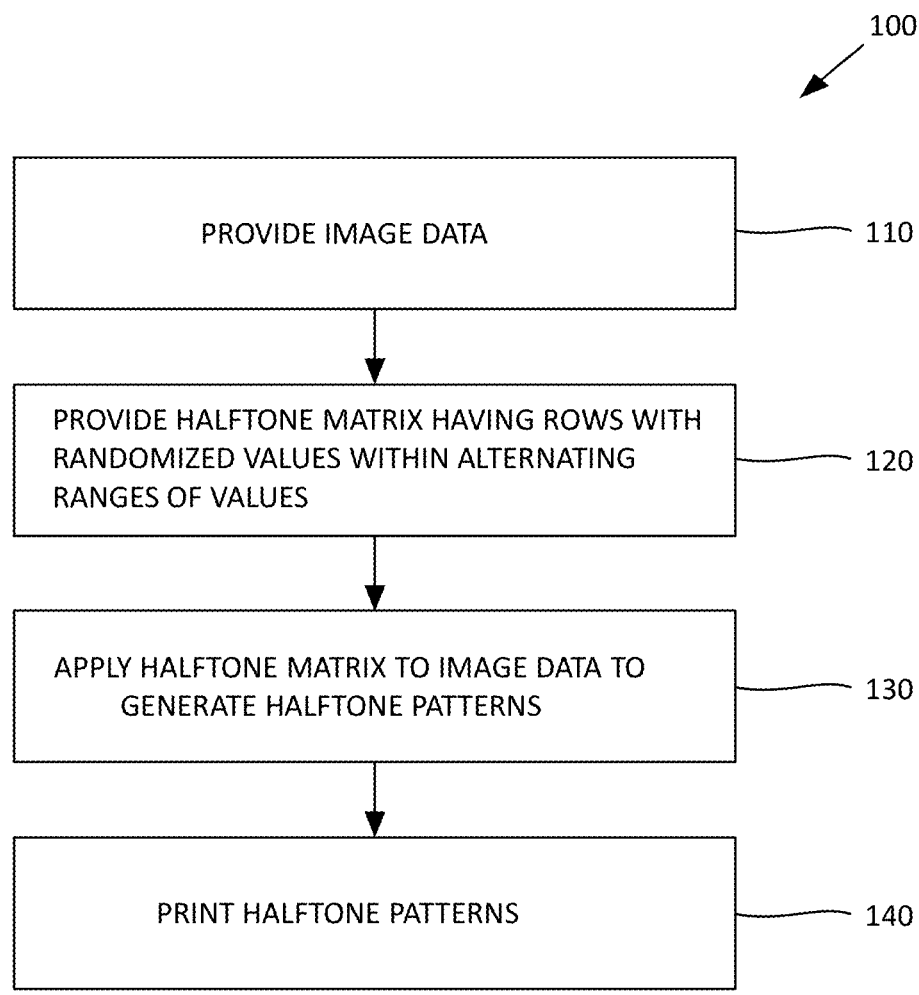
FIG. 2 shows an example method for printing image data.

FIG. 2 illustrates an example method that may be performed by the printing device of FIG. 1. Alternatively, the method may be performed partly by a computing device, and the resulting halftone patterns may be sent to a printing device for printing.

The method 100 comprises providing 110 image data to be printed. In the example printing device 10 of FIG. 1, the image data is that output by the color mapping module 36. The image data may comprise a NPac vector per image pixel.

The method 100 further comprises providing 120 a halftone matrix. In the example printing device 10 of FIG. 1, the halftone matrix 39 is stored in the storage medium 32. Each element of the halftone matrix comprises one of a set of values. For example, the halftone matrix may comprise 8-bit values, in which case each element comprises a value of between 0 and 255. Such a halftone matrix may comprise a 16×16 halftone matrix where each value occurs once. In another example, the halftone matrix may comprise 12-bit values, in which case each element comprises a value of between 0 and 4095, and a 64×64 bit halftone matrix may be provided where each value occurs once.

The halftone matrix comprises rows of elements having a sequence of ranges where each element is randomized within a corresponding ranges. In one example, each element in a row may have a value from a different range to that of an adjacent element. In a simple example, two ranges of values are provided in an 8-bit system so that one range of values is 0-127 and the other range of values is 128-255. If one element has a value selected form the first range (0-127) then the next element has a value selected from the second range. This distribution can be seen in each row of the halftone matrix of FIG. 3a.

Figures 3A, 3B:
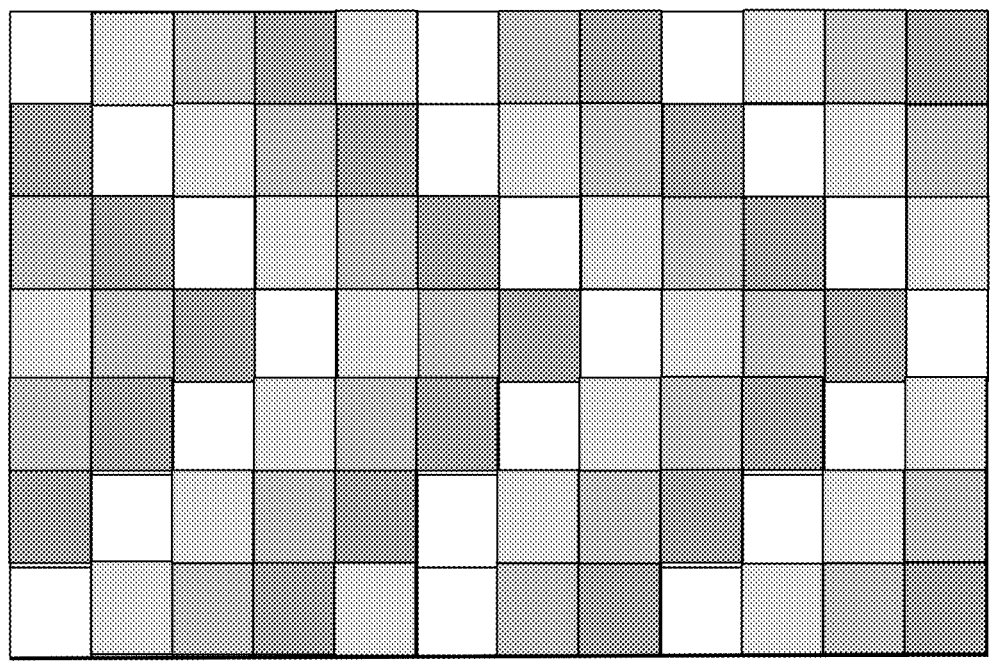
FIGS. 3a-c show examples of a halftone matrix.

In FIG. 3a, a 4×4 matrix is provided for a 4-bit value depth where the values in a first range (dark) are from the range 0-7 and the values in the second range (light) are from the range 8-15. The values for each element are selected randomly from their respective range of values such that each value occurs only once in the matrix. Values from each range are distributed uniformly across each row which has two values from the first range and two values from the other range. This provides both the uniformity required for PARAWACS halftoning as well as introducing randomness in order to avoid visual artefacts that may be present when printing with a static or fixed halftone matrix.

More generally for other bit depths, matrix sizes, and numbers of ranges, the values of the halftone matrix may be distributed randomly and uniformly across the elements of the matrix. This means that across a row there are the same number of elements with a value selected from the one range of values as elements selected from the other range(s) of values. In some examples, this may mean that in an 8-bit system and a matrix with 255 elements, all 255 values are selected once across the matrix. In a 16×16 halftone matrix with four alternating ranges of values, there are 4 values selected from each range in each row. In other examples, where less than 255 elements are used, some values will be used once and some not used at all, but the frequency of values used in one range may be the same as the frequency of values used from the other range. Whilst not providing maximum, this will provide improved uniformity compared with some known approaches. Similarly, where more than 255 elements are used in an 8-bit system, all values will be used at least once, and some values will be used twice. But the distribution of values from each range will still be uniform even if the frequency of values is not completely uniform.

Returning to FIG. 2, the method further comprises applying 130 the halftone matrix to image data to generate a plurality of halftone patterns. In an example, the image data comprises NPac vectors for each image pixel and each image pixel is "half toned" to generate respective half tone patterns each comprising a plurality of half tone pixels. Each half tone pixel is associated with an NP such that the combination of half tone pixels in the half tone pattern results in NP coverage according to the NPac vector associated with that image pixel or halftone pattern.

To get the required coverage, each values are assigned to each NP with the number assigned being proportional to their coverage as defined in the NPac vector. A simple example follows of an NPac vector having only two NP and a 255 bit value or color depth. The NPac vector is [M 0.4; Y 0.6], in other words 40% of the halftone pattern pixels should be Magenta and 60% of these pixels should be Yellow. In order to provide the required uniformity and randomness to the halftone pattern, Magenta is assigned values 0-101 (40% of 255) and Yellow is assigned values 102-255. Two ranges of values are allocated in the halftone matrix, 0-127 and 128-255 and for each element values from its associated range are randomly allocated as previously described. Values form the second range will all correspond to Yellow but some values (102-127) from the first range will correspond to Yellow and the other values (0-101) from the first range will correspond to Magenta. In other words all halftone pixels associated with the second range of values will be Yellow and halftone pixels associated with the first range will be either Yellow or Magenta in a random fashion but whilst maintaining the overall requirement that for the halftone pattern 40% of pixels will be Magenta and 60% will be Yellow. Other examples may be more complex with many more NP, different bit depths and patterns of alternating ranges.

A different halftone matrix may be generated for each image pixel or NPac vectors to generate respective halftone patterns. As randomness is introduced into the halftone matrix generation process as noted above, each halftone matrix is likely to be different and therefore each halftone pattern will be different even when the NPac vector is the same. This reduces or eliminates visual printing artifacts such as moire.

Finally, the method 100 comprises printing 140 the halftone patterns. Each of the halftone patterns may be printed in the same or a different printing pass and/or with the same of a different set of printheads.

Figure 3C:
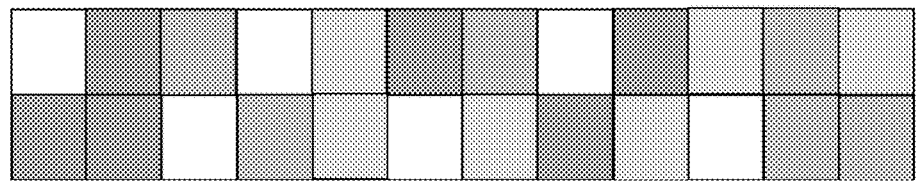

FIG. 3a-c illustrates various alternating ranges of values across and between rows in a halftone matrix. As described above, FIG. 3a illustrates a simple example of a halftone matrix having randomized values within alternating ranges of values. Here only two ranges are used in each row and values are randomly selected from a range corresponding to each element of the halftone matrix. The range of values corresponding to each adjacent element may alternate for improved randomness, although it is possible that the ranges may alternate every second or third element instead. In this case the alternating ranges of values are arranged according to a simple repeating pattern although other patterns could alternatively be used. In a further alternative the ranges of values may be randomly assigned to elements of the row.

Each row of the halftone matrix has a different pattern of alternating ranges compared with an adjacent row. In this example, the same pattern of the preceding row is used but offset, in this case by one element or range of values. For example the first and third rows starts of a "dark" range of values and the second and fourth range of values start on a "light" range of values. Again different patterns could be used, or each row may be offset by a random amount. Using different patterns of ranges of alternating values in adjacent rows again reduces visual printing artifacts such a moire.

Part of a more complex halftone matrix is illustrated in FIG. 3b. This has four ranges of values, for example: range 1 [0-63] shown as white on the figure; range 2 [64-127], light grey; range 3 [128-195], mid grey; range 4 [196-255] dark grey in an 8-bit system. It can be seen that the ranges of values alternate in a repeating pattern across each row—range 1, then range 2, then range 3, then range 4, then back to range 1 and repeat. As with the halftone matrix of FIG. 3a, a value from the range of values corresponding to each element is randomly selected. The random selection from each row is from values in the range which have not already been selected. In some examples where the number of elements in the halftone matrix is more than the total number of values, the selection may be based on those values that have not been picked before or that have only been picked once or a low number of times before in order to maximize uniformity.

The second row of the halftone matrix has the same pattern of alternating ranges as the first row, but is offset by one. The third row is offset from the first row by two ranges and the fourth row is offset by three ranges of values compared with the first row, and offset by one range of values compared with the third row. This ensures that the alternating ranges of values are arranged differently compared with adjacent rows. The fifth row is inset by one range of values compared with the fourth row, and is offset by the same amount as the third row. Similarly the sixth row is offset by the same amount as the second row and the seventh row has the same pattern as the first row. This provides a zig-zag pattern of common alternating ranges—in other words a zig-zag pattern down the rows of each of ranges 1-4.

Different patterns of alternating ranges of values may be better for rendering fine line at different angles. For example, it has been found that the zig-zag pattern favors horizontal, vertical, +45 and −45 degree lines. In other words, such lines are rendered with regularly spaced dots that can be well seen and may compared with other approaches where the dots are clustered together in some parts of the line and with large gaps in other parts of the line making them less visible. This pattern may therefore be useful for architectural or design drawings. A pattern where subsequent rows are offset by one range of vales compared with a preceding row, but without the zig-zag pattern has been found to favor horizontal, vertical and +45 degree lines but not −45 degree lines. Other patterns may favor different line orientations and/or shapes.

FIG. 3c shows part of a halftone matrix where the ranges of values are randomly located at elements of different rows. However, the same number of each range of values are provided in each row to ensure uniformity. In an alternative arrangement, the pattern of each row may be maintained but the offset of each row randomly allocated from offsets not already used in a particular offset range. For example, row x starts with range y which is different for each offset range. In one example, row 1 may start with offset=2, then row 2 starts with offset=0, then row 3 starts with offset=1, then row 4 starts with offset=3. This approach may then repeat for the next 4 rows. Of course, this is just an example and many alternative arrangements will be possible.

Figure 4:
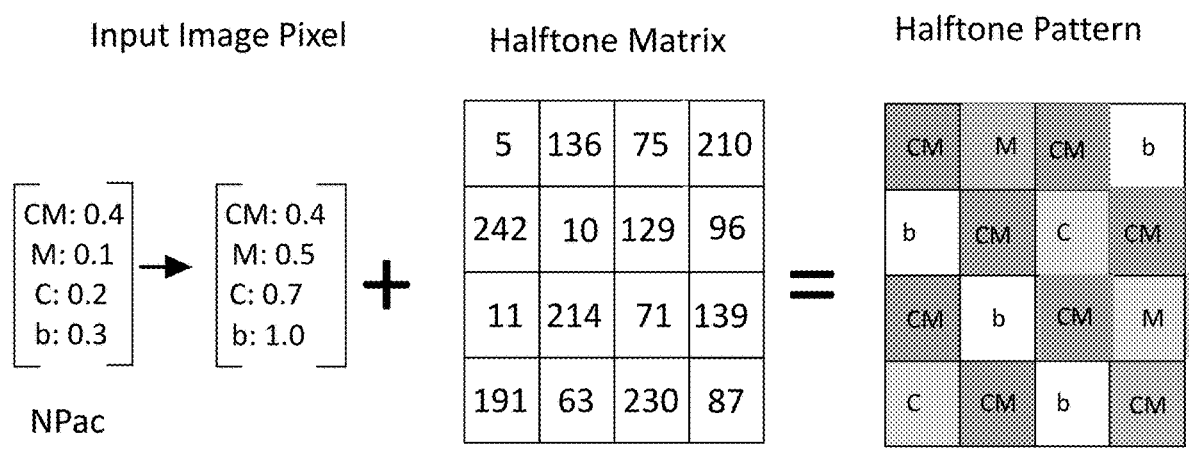
FIG. 4 illustrates application of a halftone matrix to an NPac vector according to an example.

FIG. 4 illustrates an example of how a half tone matrix may be applied to image data. In this example, the image data is in the form of an NPac vector for an image pixel. Part of a halftone matrix is shown which includes four ranges of values in an 8 bit color depth system—range 1=0-63; range 2=64-127; range 3=128-191; range 4=192-255. The NPac vector is [CM:0.4 M:0.1C:0.2 b:0.3], in other words the printed halftone pattern should have the following coverage area of NPs over a unit area: 40% Cyan combined with Magenta, 10% Magenta only, 20% Cyan and 30% blank or white. The coverage area values for each NP are recalculated as cumulative coverage areas. The cumulative coverage areas are build with a predetermined order, for example lighter to darker NP. In the above example this may be expressed as [CM:0.4 M:0.5 C:0.7 b:1.0] where NP CM=40%, CM+M=50%, CM+M+C=70% and CM+M+C+b=100%. In an example using cumulative coverage areas makes the halftoning stage easier to implement, although in other examples the raw NPac vector coverage areas could alternatively be used.

These NP groups are then allocated values according to their cumulative coverage areas. In the 8-bit system with values from 0-255, Cyan-Magenta CM is allocated the first 40% or 0-102. In other words when the value of an element in the halftone matrix is 0-102 the corresponding halftone pixel will be CM. All values in range 1 [0-63] will therefore correspond to CM and some values in range 2 [64-127] will also correspond to CM.

Magenta M is allocated the next 10% of values, that is 102-127, so that some halftone pixels corresponding to elements randomly selecting values from range 2 [64-127] will be randomly assigned M and some will be CM. Cyan C is allocated the next 20% of values, that is 128-178, with white or no color b being allocated the remaining 30% of values, that is 179-255.

A halftone pattern is generated by applying a halftone matrix to the input NPac vector in which the NP are randomly allocated but with the resulting coverage of each corresponding to that defined in the NPac vector. For example, the top left corner element of the halftone matrix has a randomly selected value from range 1 (0-63). This value 5 corresponds to an NP of CM. the next element has a value randomly selected from range 3 (128-191). This value 136 corresponds to an NP of M, and so on. Whilst only a part of the halftone matrix has been shown for simplicity, it will be appreciated that this might be a 16×16 matrix where values from the different ranges are randomly selected but uniformly distributed across the rows and columns of the matrix so that each value occurs once.

Figure 5:
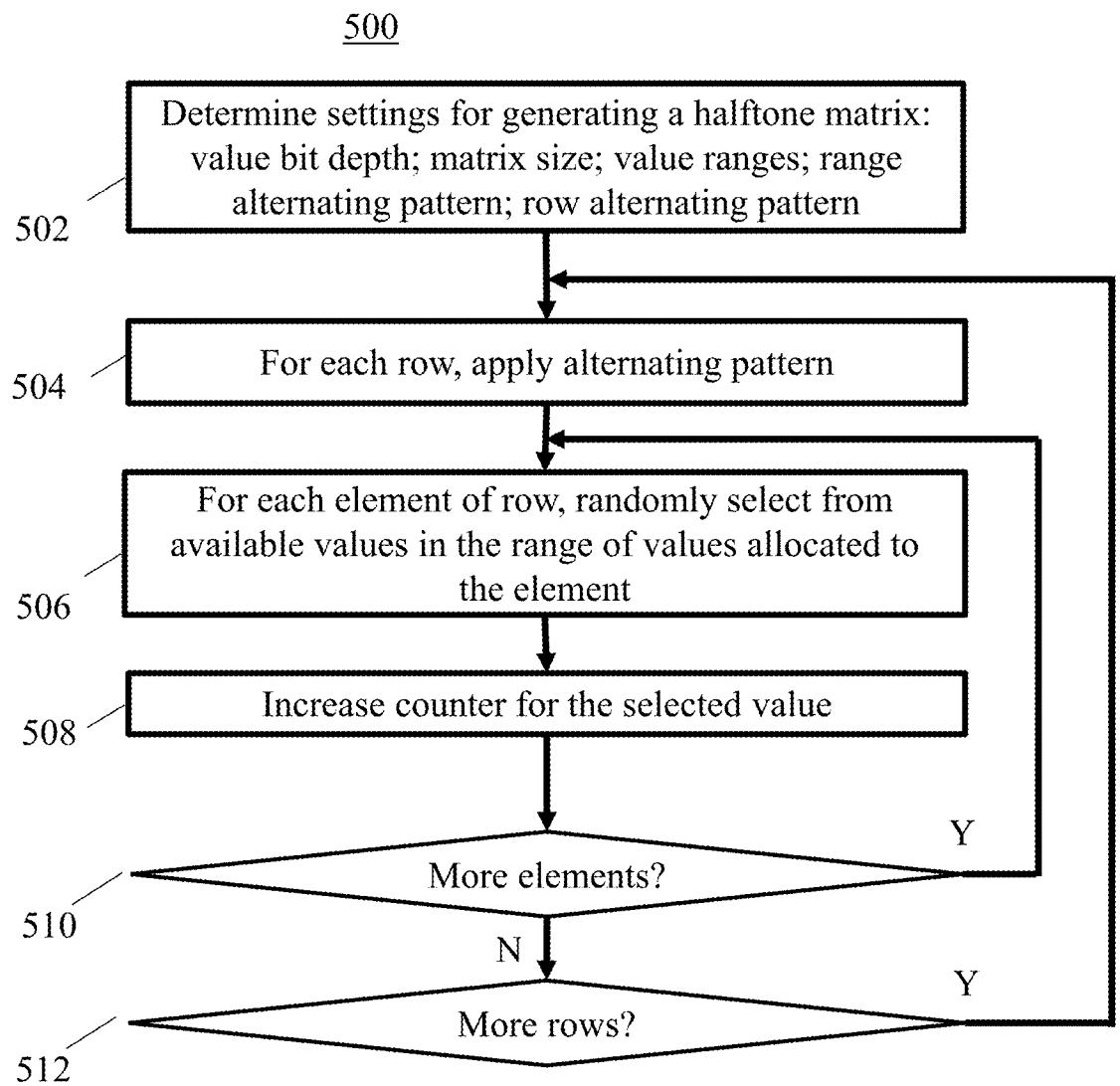
FIG. 5 shows an example method for generating a halftone matrix.

FIG. 5 illustrates an example method of generating a halftone matrix that may be performed by the printing device of FIG. 1. Alternatively, the method may be performed partly by a computing device, and the resulting halftone patterns may be sent to a printing device for printing.

The method may be implemented to generate a halftone matrix for each image pixel NPac vector input so that the halftone matrices used for adjacent image pixels are randomized. The method 100 comprises determining 502 settings for generating the halftone matrix. These settings include the value bit depth, for example 8-bit, 12-bit and so on. In an example, higher quality lines may be rendered using higher level of bit-depth. However, this is limited by the input image data and in some examples, it may be desirable to reduce bit-depth, effectively quantizing coverage areas. This sacrifices how fine-grained line tones can be represented but some shade differences may not be perceptible whereas the transitions may be more perceptible. A lower bit-depth allows smaller matrices within which all tones are represented which in turn improves line rendering at different angles. The size of the matrix can also be set where this is not determined by the bit depth, for example for an 8-bit value depth instead of a 16×16 matrix another size may be specified such as 10×10 or 20×24. The number of ranges of values used is also selected, for example 2, 4, etc. This selection may be based on a consideration of the angles of lines to be represented. For example two alternating ranges will well represent horizontal and vertical lines whereas angles lines may benefit from a greater number of alternating ranges such as three or four. The pattern of ranges across rows and the alternating row pattern may also be selected. This may be based on the type of drawing to be printed and the type of lines or other fine features to favor. Examples have already been described and include a fixed repeating pattern of value ranges across the rows and fixed offset adjustments for subsequent rows to generate a zig-zag pattern as previously described.

The method then applies 504 the set alternating pattern for each row. This may be updated for each new row. For example, alternating pattern may be to select a value for each element from a range that progresses linearly or randomly for each element.

For each element of a row of the halftone matrix, the method randomly selects 506 from available values in the range of values allocated to the element by the pattern. The available values may be those that have not previously been used within the current range and for the current halftone matrix. This ensures that for a matrix size matching the value bit depth, that each value is used only once thereby providing a uniform distribution. Some examples may use a different approach, such as limiting the greatest number of times a value can be reused to no more than one more than the number used for the least used value.

The method increases 508 a counter associated with the value selected. This enables the method to track the number of times each value has been used, for example to remove it from being selected again in the same halftone matrix.

The method then determines 510 whether there are more elements in the row and if so returns to randomly allocated a value to the next element in the row of the halftone matrix at 504. If all elements for a row have been completed, the method determines 512 whether there are more rows to process and if so returns to applying a pattern for the next row at 504.

Various different patterns may be applied to the rows to ensure that their pattern of alternating ranges is different from that of adjacent rows. For example a sequential offset pattern may be applied where row 1 starts with range 1, row 2 starts with range 2, row 3 starts with range 3 and so on. A zig-zag pattern may be employed where the rows alternatively apply a positive sequential offset then a negative sequential offset. The position of the ranges in each row may alternatively be randomized. In one example, the offset is randomized whilst maintaining overall uniformity—in other words the offset is selected randomly from offsets that have not already been used, at least for a group of adjacent rows.

Once it has been determined 512 that all rows have been completed, the generated halftone matrix may be used with an image data input such as an NPac vector. A new halftone matrix is then generated for a subsequent NPac vector or other image data associated with an image pixel. Some halftone matrices may be re-used, for example on NPac for image pixels that are not adjacent each other; however for maximum randomness a new halftone matrix is generated for each image pixel.

Figure 6:
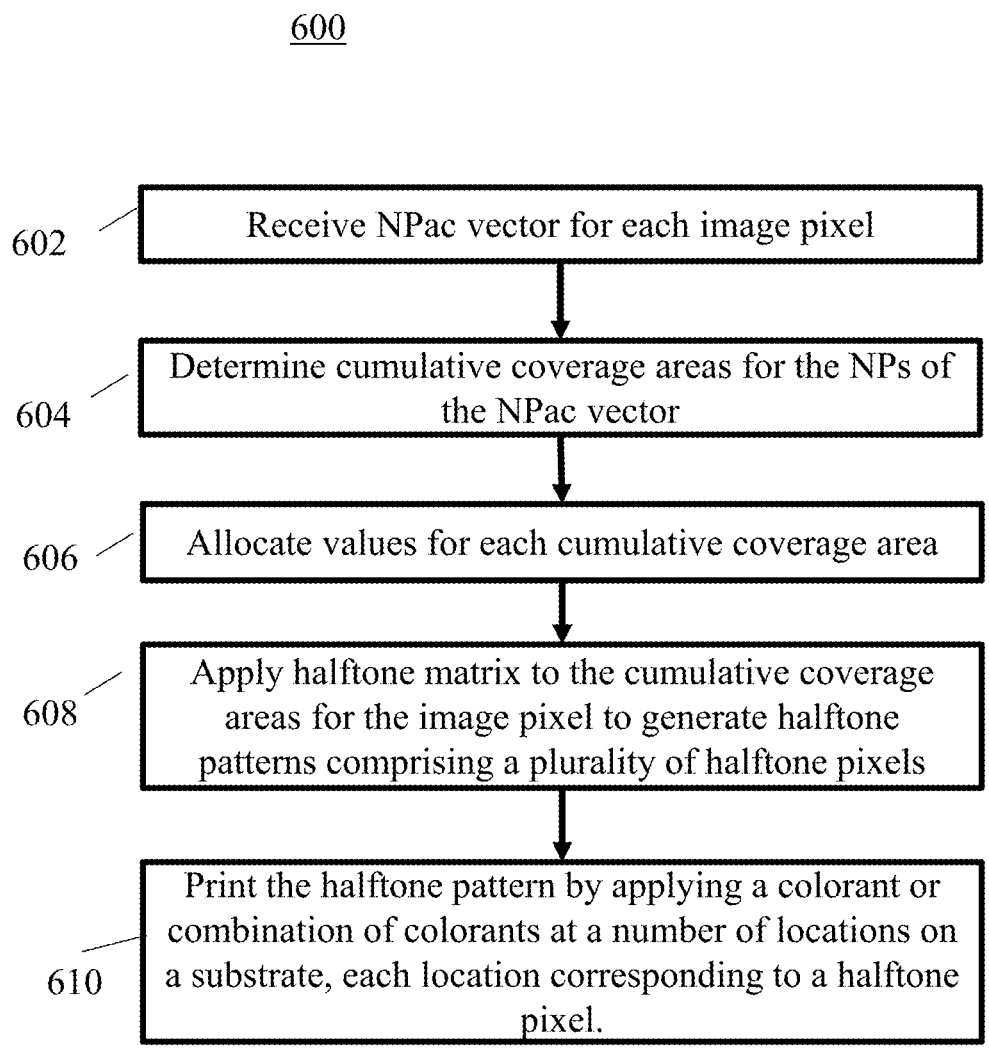
FIG. 6 shows an example method for applying a halftone matrix to image data.

FIG. 6 illustrates an example method of generating a halftone pattern that may be performed by the printing device of FIG. 1. Alternatively, the method may be performed partly by a computing device, and the resulting halftone patterns may be sent to a printing device for printing.

The method 600 is suitable for a HANS pipeline and comprises receiving 602 a NPac vector for each image pixel. This may be received from a color separation process as previously described. The NPac vector comprises coverage areas for a number of NP in order to render the image pixel by printing.

The method comprises determining 604 the cumulative coverage areas of the NPs. Examples have been previously described and the NPs may be arranged from darkest to lightest, lightest to darkest or other predetermined orders. The method then allocates values for each coverage area where the range of values allocated to each NP is proportional to its coverage area as defined by the NPac vector. The range of values allocated to each NP will usually not coincide with the ranges of values used for randomly selecting a value for each element of a halftone matrix.

The method then applies 608 a halftone matrix to the image data such as an NPac vector in order to generate a halftone pattern for that image data. The halftone pattern comprises a plurality of halftone pixels each of which corresponds to a respective element of the halftone matrix. The halftone matrix may be obtained using the method of FIG. 5 or another method which provides a random but uniform distribution of values. The halftone pixels are each associated with a value that was randomly selected when generating the halftone matrix and which corresponds to an NP from the NPac vector. The NP's associated with the pixels of the halftone pattern are therefore randomly distributed but their distribution is such that they also correspond with the coverage areas defined for each NP in the NPac.

The method then prints 610 the halftone pattern by applying one or a combination of colorants at locations on a substrate such as paper. The locations correspond to the halftone pixels and the colorants applied at each location correspond with the NP of the respective halftone pixel. Additional NPac vectors are processed in the same way to generate a printed image with a distribution of NP that corresponds with the received image data but which is randomized in order to avoid visual artifacts such as moire.

Examples provide a number of advantages including avoiding moire patterns and improving the rendering of fine lines and other features. Examples may be applicable to printing systems employing HANS pipelines such as those using PARAWACS halftoning pipelines. However, examples may also be applied to non-HANS pipelines such those using matrix halftoning in ink-vector domains In a non-HANS example using ink-vectors as image data to be halftoned, each colorant may be treated separately. For example, an ink vector having values for multiple colorants is separated into ink vectors for respective colorants, and each has its own respective halftone matrix applied to generate respective halftone patterns. For example, an ink vector may comprise [C:0.25 M:0.5 Y:0.25 K:0] represents 25% of Cyan, 50% of Magenta, 20% of Yellow, and 5% of Black in an addressable area of substrate. For Cyan with value 25%, this may represent 0-63 on an 8-bit depth value range of 0-255. Applying the halftone matrix effectively allocated where Cyan colorant will be applied in the halftone pattern, which dependents on the ranges of values in the halftone matrix and the randomized values within it. For Magenta, halftone matrix values 0-127 may correspond to halftone pixels of Magenta in the respective halftone pattern. Similarly, respective halftone matrices may be individually applied to Yellow and Black The halftone matrix applied to each colorant of a given ink vector may be the same or different halftone matrices may be applied to each colorant.

Figure 7:
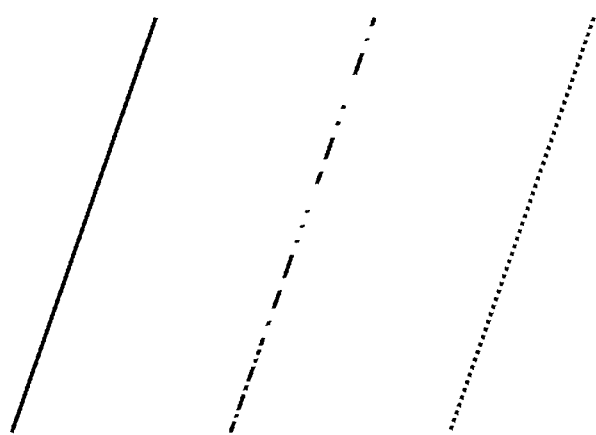
FIG. 7 illustrates rendering of a line.

FIG. 7 illustrates rendering of dots on a substrate in one direction. The left most image represents the ideal line. The central image represents a line rendered using known approaches resulting in clustering of dots and large gaps between dots. It can be seen, for example, that were a horizontal or vertical line to be rendered and which passes through one of the gaps, especially where this line is very fine, that such a line may be lost. The right most image represents a line rendered using an example in which the dots are uniformly spaced with uniform gaps therebetween. Horizontal and vertical lines passing through the rendered line have a high chance of including a dot and therefore are less likely to be lost.

The preceding description has been presented to illustrate and describe examples of the principles described. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any other of the examples.

What is claimed is:

1. A method comprising:
providing image data to be printed;
applying a halftone matrix to the image data to generate a plurality of halftone patterns;
wherein the halftone matrix comprises rows of elements having a sequence of ranges of values where each element is randomized within a corresponding range of values.

2. A method as claimed in claim 1, wherein the image data comprises a Neugebauer Primary area coverage (NPac) vector, and applying the halftone matrix to the image data comprises assigning a Neugebauer Primary (NP) to each pixel of the halftone pattern according to the NPac vector and the value of the corresponding element of the halftone matrix.

3. A method as claimed in claim 1, wherein the image data comprises an Ink vector, and applying the halftone matrix to the image data comprises assigning a colorant to pixels of the halftone pattern according to the proportion of the colorant in the Ink vector and the value of the corresponding element of the halftone matrix.

4. A method as claimed in claim 1, wherein the sequence of ranges varies regularly or randomly within each row and between rows.

5. A method as claimed in claim 2, wherein values are allocated to each NP according to the coverage area of the NP in the NPac vector.

6. A method according to claim 5, wherein the values allocated to each NP are based on a cumulative coverage area of the NPs in the NPac vector.

7. A method according to claim 6, wherein the accumulation of NP's is based on tone.

8. A method according to claim 1, wherein the halftone matrix is a PARAWACS matrix.

9. A method as claimed in claim 1, wherein each row of the halftone matrix has a uniform distribution of values and the halftone matrix has an equal frequency of each value.

10. A method as claimed in claim 1, wherein the halftone matrix comprises one or more of the following: two alternating ranges; alternating ranges arranged in a repeating order; alternating ranges arranged in a random order.

11. A method as claimed in claim 1, wherein the alternating ranges of a row are arranged differently to the alternating ranges of an adjacent row.

12. A method as claimed in claim 11, wherein the alternating ranges of each row are arranged in a repeating order and the repeating order of a said row is offset compared with an adjacent row.

13. A method as claimed in claim 12, wherein the alternating ranges of adjacent rows are arranged to form a zig-zag pattern of common alternating ranges.

14. A printing device comprising:
a printhead assembly;
a processor; and
a storage medium storing a halftone matrix and instructions for execution by the processor;
wherein the halftone matrix comprises rows of elements having a sequence of ranges of values where each element is randomized within a corresponding ranges of values; and
wherein the instructions, when executed by the processor, cause the processor to:
receive image data;
apply the halftone matrix to the image data; and
print the halftone patterns using the printhead assembly.

15. A non-transitory computer-readable storage medium comprising a set of computer-readable instructions that, when executed by a processor, cause the processor to:
generate a halftone matrix comprises rows of elements having a sequence of ranges of values where each element is randomized within a corresponding ranges of values; and
applying the halftone matrix to image data to generate a plurality of halftone patterns.

* * * * *